United States Patent [19]
Mao

[11] Patent Number: 5,991,912
[45] Date of Patent: Nov. 23, 1999

[54] DIGITAL VIDEO TRANSPORT ERROR HANDLING IN CELL BASED COMMUNICATIONS SYSTEMS

[75] Inventor: Weidong Mao, Princeton, N.J.

[73] Assignee: Next Level Communications, Rohnert Park, Calif.

[21] Appl. No.: 08/856,674

[22] Filed: May 15, 1997

[51] Int. Cl.⁶ .................................................. H03M 13/00
[52] U.S. Cl. .......................... 714/776; 714/704; 714/758; 370/395
[58] Field of Search ................................ 371/37.02, 5.1, 371/30, 43.1, 37.7; 370/392, 474, 395, 471

[56] References Cited

U.S. PATENT DOCUMENTS

| | | | |
|---|---|---|---|
| 5,533,033 | 7/1996 | Ratner | 371/30 |
| 5,535,221 | 7/1996 | Hijikata et al. | 371/5.5 |
| 5,596,581 | 1/1997 | Saeijs et al. | 370/394 |
| 5,668,810 | 9/1997 | Cannela, Jr. | 370/392 |
| 5,758,085 | 5/1998 | Kouoheris et al. | 395/200.61 |
| 5,812,205 | 9/1998 | Milnes et al. | 348/460 |

*Primary Examiner*—Emmanuel L. Moise
*Attorney, Agent, or Firm*—J. P. Blasko Professional Corp.; Charles A. Eldering; John P. Blasko

[57] ABSTRACT

In a communications system packets containing compressed digital signals are transported in multiple cells, typically in an Asynchronous Transfer Mode format. Upon reception of these cells, a determination is made as to whether cells have been lost, additional cells inserted, or whether there were bit errors in the transmission of the cells. If so, null packets are substituted for the erred packets and are sent to the video decompression layer.

34 Claims, 4 Drawing Sheets

DIGITAL VIDEO TRANSPORT ERROR HANDLING IN CELL BASED COMMUNICATIONS SYSTEMS

FIELD OF THE INVENTION

The present invention relates to a method and apparatus for the handling of errors in the transport of digital video signals in a cell based communications system.

BACKGROUND OF THE INVENTION

A wide range of digital communications systems can be used for the transport of compressed digital video signals including the Motion Picture Experts Group (MPEG) format signals. Digital video will be a standard for the transmission of television signals, and eventually the majority of television signals will be transported in a digital format.

Asynchronous Transfer Mode (ATM) networks, which are used to transport information using statistical multiplexing, can be used to transport MPEG signals which are placed in ATM cells and routed through ATM networks. Cell loss, cell misrouting, and the corruption of information in cells caused by bit errors which occur during transmission can all lead to the corruption of MPEG digital video information.

Because the efficiency of ATM networks relies in part on the ability of the services to deal with occasional cell loss, and because ATM networks have no retransmission protocol, cell loss and the corruption of packets of MPEG information are inevitable.

Loss of MPEG information can result in significant degradation of the image quality, and can result in image "freezing" or "blocking." Such problems have not occurred in traditional analog television systems because occasional noise resulted in "snowy" images, which if infrequent, were not perceived by the viewer. MPEG video decoders, which decompress the video signal and produce final images for viewing, can handle some MPEG packet loss and corruption without significant degradation in the final picture, but the ability of the MPEG decoder to handle corrupted data depends in part on identifying which MPEG packets have been lost or corrupted.

For the foregoing reasons, there is a need for a method and apparatus for handling errors in a digital video transport system.

SUMMARY OF THE INVENTION

The present invention is directed to a method and apparatus for handling errors in a digital video transport system. Packets which arrive over an Asynchronous Transfer Mode (ATM) cell based network and containing Motion Picture Expert Group (MPEG) packets of video data are inspected to determine if there are errors in the MPEG packets. If so, null MPEG packets are substituted for the erred packets. This prevents unwanted freezing and blocking of the video image which can occur if faulty MPEG packets are passed from the transmission system to the MPEG decoder and video display system.

In a preferred embodiment, MPEG packets are placed in a Convergence Sublayer Protocol Data Unit (CS-PDU) and information regarding the length of the MPEG packet or packets is stored in a trailer field in the CS-PDU. The CS-PDU is mapped into ATM cells.

When two MPEG packets are placed in a CS-PDU, the CS-PDU is mapped into eight ATM cells. When a single MPEG packet is mapped into a CS-PDU, the CS-PDU is mapped into five ATM cells. The mapping of a single MPEG packet into a CS-PDU occurs when a MPEG packet contains a Program Clock Reference (PCR) timestamp, and that MPEG packet is the first of two packets. The PCR is time sensitive and should not be delayed by waiting for an additional MPEG packet.

When the ATM cells arrive, they are inspected to determine if the CS-PDU is contained in five or eight cells. In a preferred embodiment the end of an ATM Adaptation Layer 5 (AAL5) packet is determined using from the last bit of Payload Type Indicator (PTI) field in the ATM header. A comparison is made between the payload length based on the number of ATM cells received in the CS-PDU payload and the length as described in the CS-PDU trailer. In the event that the two measurements do not agree a determination is made that the number of cells received is incorrect, and that there will be errors in the MPEG packets. Null MPEG packets are substituted for the erred packets.

Error checking is also done on the received CS-PDU using the Cyclical Redundancy Check (CRC) present in the trailer field. If the CS-PDU has been received in error, null MPEG packets are substituted for the erred packets.

The present invention avoids the degradation of video quality which would occur if erred packets were simply allowed to propagate through the system and were decoded along with properly received MPEG packets.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENT

Figure 1:
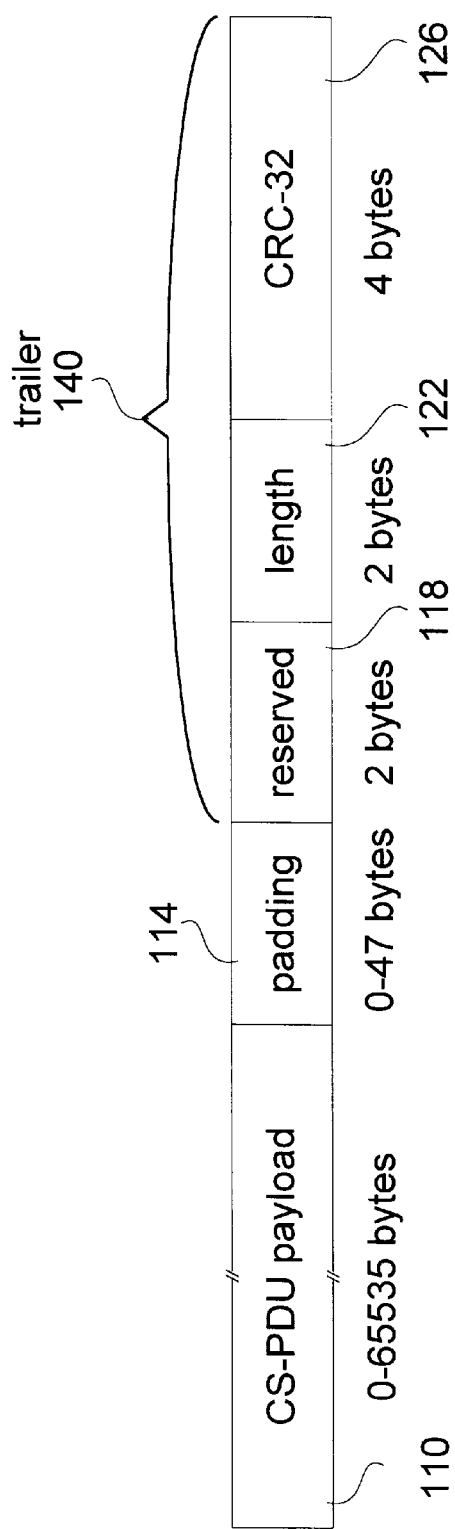
FIG. 1 illustrates a ATM Adaptation Layer 5 (AAL5) Convergence Sublayer Protocol Data Unit (CS-PDU)

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 4 in particular, the apparatus of the present invention is disclosed.

FIG. 1 illustrates an ATM Adaptation Layer 5 (AAL5) Convergence Sublayer Protocol Data Unit (CS-PDU) which contains a CS-PDU payload 110 ranging from 0 to 65,535 bytes in length. A padding field 114 is also present in the CS-PDU illustrated in FIG. 1, and may range in length from 0 to 47 bytes. A trailer 140 in the CS-PDU of FIG. 1 contains a reserved field 118, a length field 122, and a CRC-32 field 126.

Figure 2:
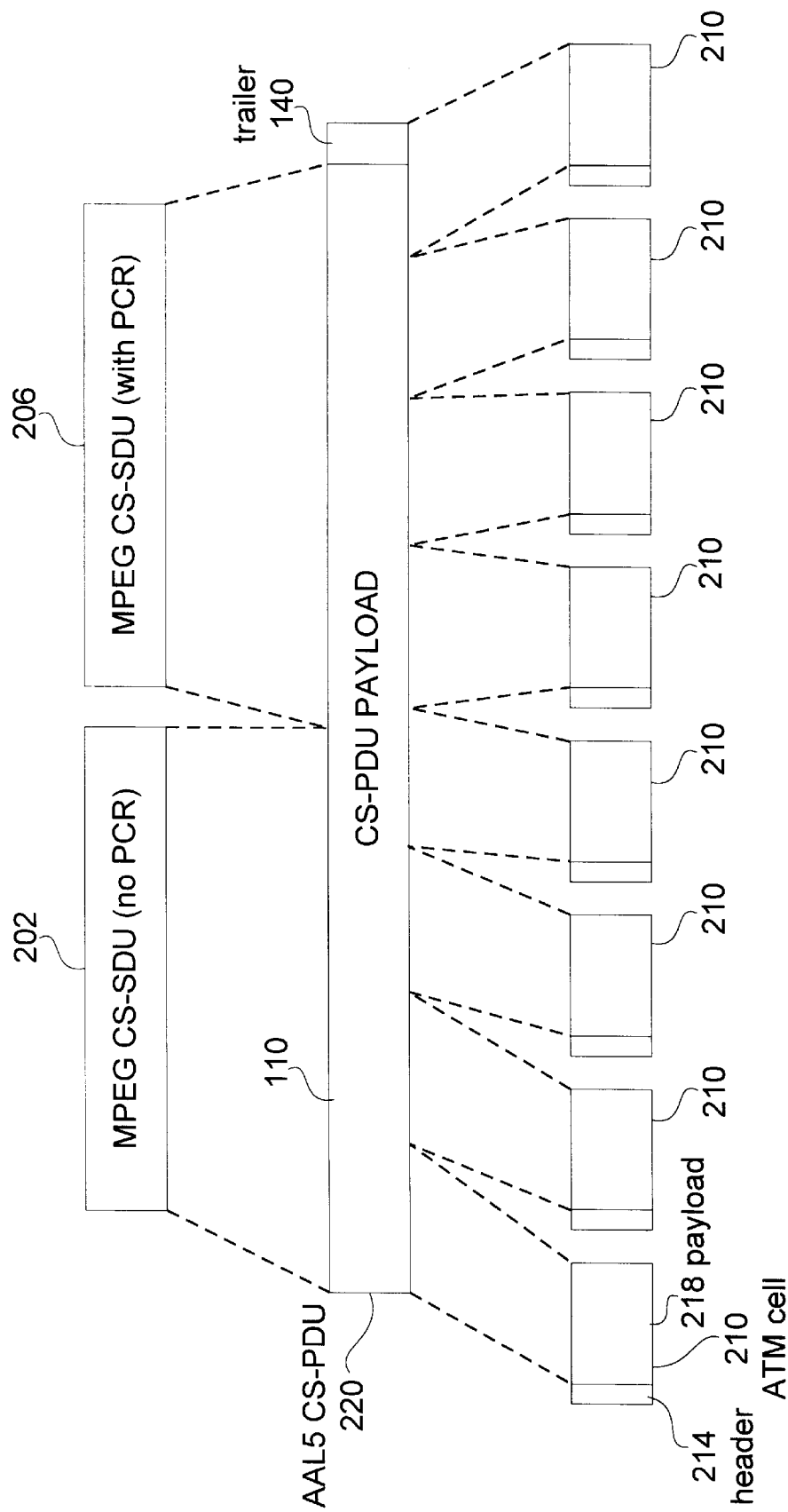
FIG. 2 illustrates the mapping of two MPEG Convergence Sublayer Service Data Unit (CS-SDU) into an AAL5 CS-PDU and subsequent mapping of the AAL5 CD-PDU into eight ATM cells.

FIG. 2 illustrates the mapping of two MPEG Convergence Sublayer Service Data Units (CS-SDUs) into an AAL5 CS-PDU and subsequent mapping of the AAL5 CD-PDU into eight ATM cells. The mapping illustrated in FIG. 2 is used when the first MPEG CS-PDU does not contain a Program Clock Reference timestamp. In such cases a MPEG CS-SDU without a timestamp 202 is mapped into the CS-PDU payload 110 of the AAL5 CS-PDU 220.

A second MPEG CS-SDU with or without as PCR is also mapped into the AAL5 CS-PDU. As illustrated in FIG. 2, a MPEG CS-SDU with a timestamp 206 is mapped into the CS-PDU payload 110. A trailer field 140, as illustrated in FIG. 1, is contained within AAL5 CS-PDU 220.

The AAL5 CS-PDU 220 containing two MPEG CS-SDUs is mapped into eight ATM cells 210. Each ATM cell 201 contains a header 214 and a payload 218. The format for ATM cells 210 is well understood by those skilled in the art and is described in detail in the book by Martin de Prycker entitled *Asynchronous Transfer Mode*, published by Ellis Horwood Limited, Hertfordshire, UK, which is incorporated herein by reference.

The header 214 contains a Payload Type Identifier (PTI) field which in a preferred embodiment is three bits in length.

Figure 3:
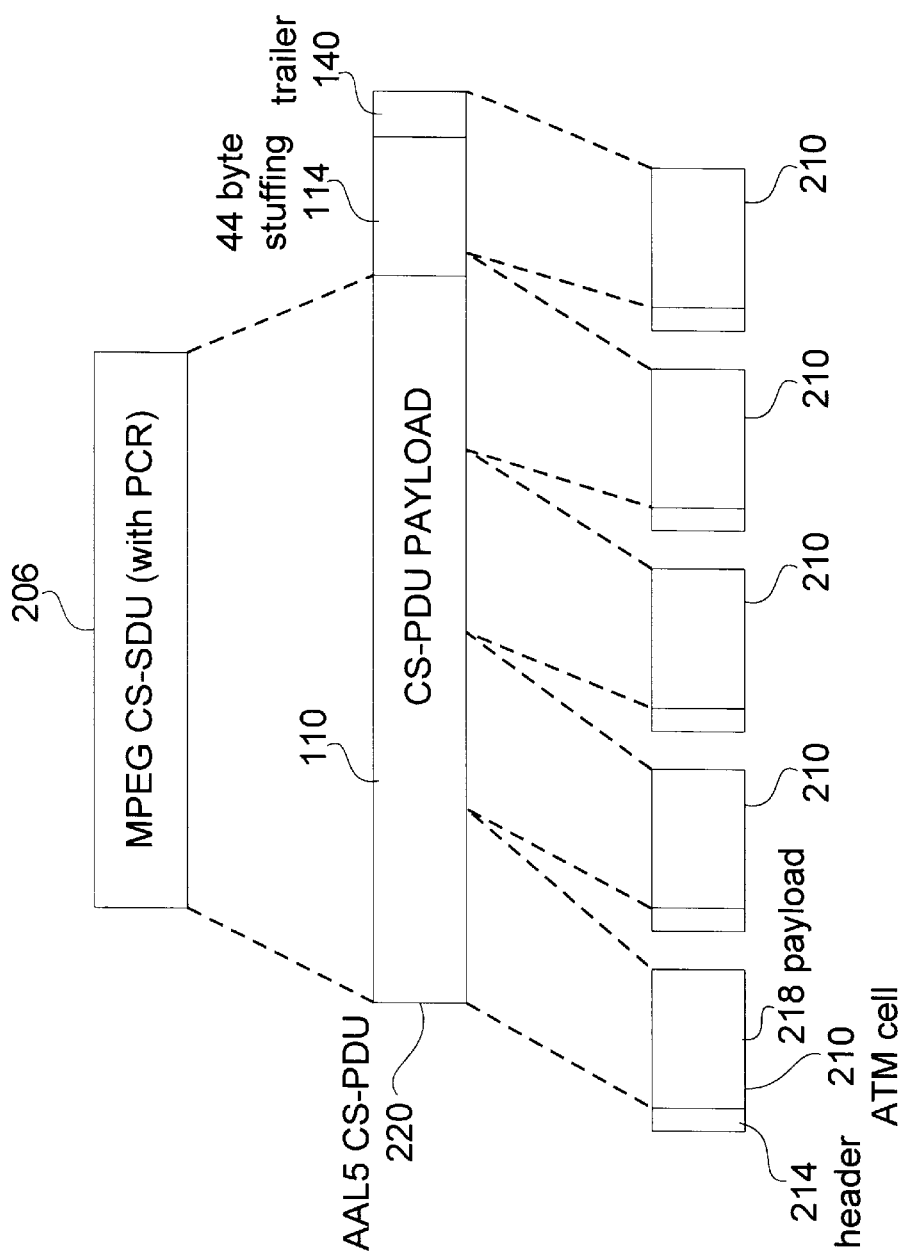
FIG. 3 illustrates the mapping of one MPEG CS-SDU into an AAL5 CS-PDU and subsequent mapping of the AAL5 CD-PDU into five ATM cells.

FIG. 3 illustrates the mapping of a single MPEG CS-SDU in to an AAL CS-PDU. In this case an MPEG CS-SDU with a PCR 206 is mapped into an AAL5 CS-PDU 220 which has a payload 110, a 44 byte stuffing 114, and a trailer 140. The AAL5 CS-PDU 220 is mapped into five ATM cells 210, each cell having a header 214, and payload 218.

In a preferred embodiment, the decision to map one or two MPEG packets into the AAL5 CS-PDU depends on whether the first MPEG packet of a pair of packets contains a PCR. The PCR is sampled based on the 27 MHz clock in the MPEG transmitter side. It is important to transmit the MPEG PCR without waiting for a second MPEG packet in order to minimize the MPEG jitter on the transmitter end. Failure to reduce the jitter can result in approaching the maximum allowable jitter of approximately one MPEG packet, which is equivalent to about 200 $\mu$s at a transport rate of 7.5 Mb/s.

In delivering MPEG services over an ATM network, cell loss or error will cause degradation of the video and audio presentations. There are several mechanisms for cell loss and error, which include loss of one or more ATM cells due to switching/multiplexing traffic congestion; bit errors which occur in the physical transmission medium; and cell misrouting in the ATM switches.

In a preferred embodiment the mapping of the MPEG packets into the AAL5 CS-PDU is done such that the end of the AAL5 CS-PDU can be determined from the last bit of the PTI field in the ATM header 214. If the last bit of the PTI field is set to '1' the current ATM cell payload contains the last cell of the AAL5 packet. Otherwise, it indicates the beginning or continuation of the AAL5 CS-PDU.

In order to make a determination that MPEG packets have been received incorrectly, the CRC-32 field 126 is processed for errors, and the length of the AAL5 CS-PDU field as given by the length field 122 is compared with a calculation of the length based on the number of cells received in a packet as determined from the PTI field in the ATM header 214.

Figure 4:
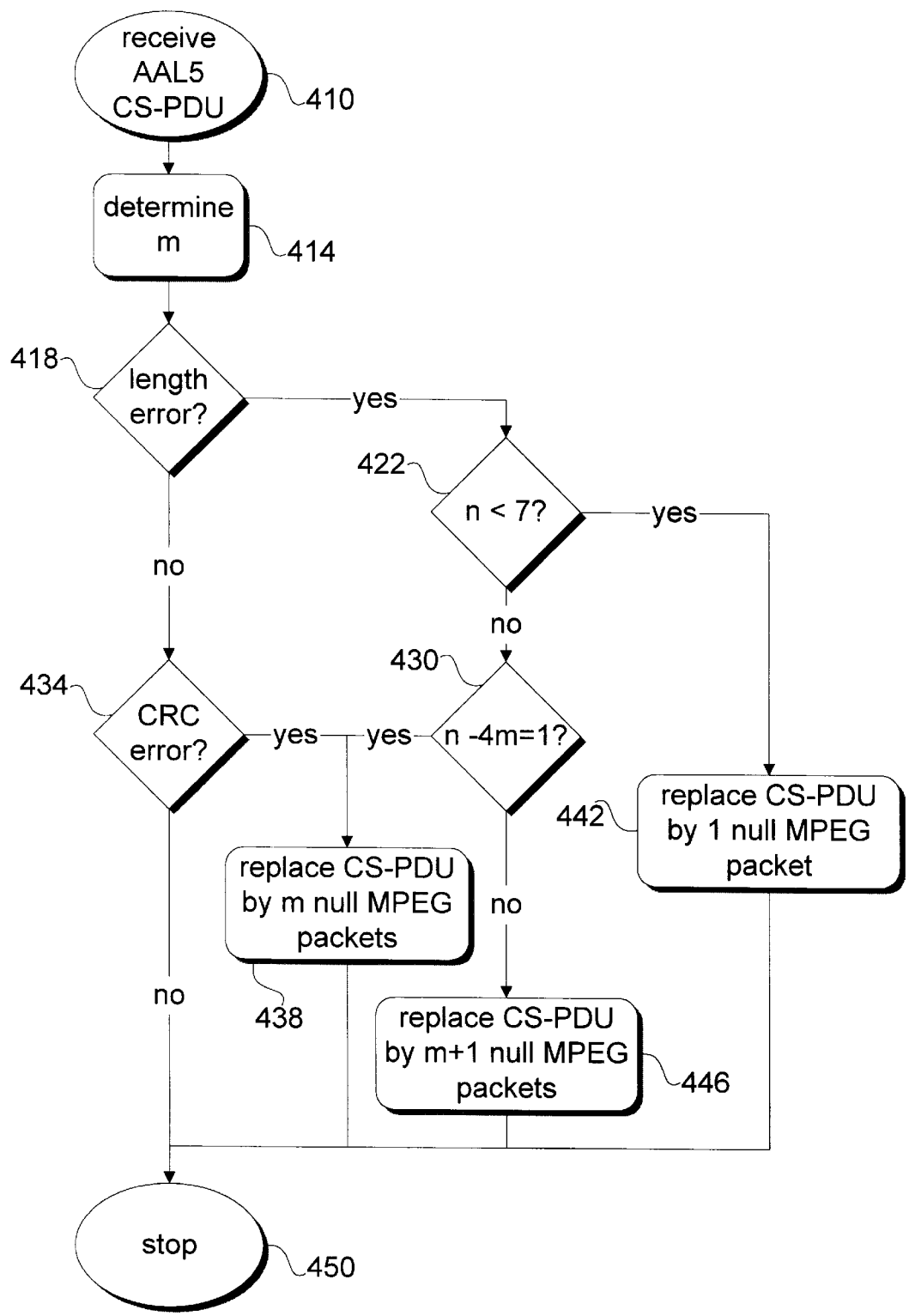
FIG. 4 illustrates a method of determining if there are errors in received AAL5 CS-PDUs and for replacing erred MPEG packets with null MPEG packets.

A method of determining if there are errors in received AAL5 CS-PDUs and for replacing erred MPEG packets with null MPEG packets is illustrated in FIG. 4. In a first step 410 AAL5 CS-PDUs 220 are received in n ATM cells 210. In a preferred embodiment determination of n is made based on the content of the PTI field in the ATM header 214.

Once determination of n, the number of ATM cells containing the MPEG packets is made, the number of MPEG packets, m, can be determined in a second step 414. In a preferred embodiment, this determination is made using the relationship $$m = \text{Integer}[n/4].$$

A determination as to whether the length of the received AAL5 CS-PDU is made in a length error test 418. In a preferred embodiment, determination that the correct number of ATM cells 210 has been received is made based on determining if $$0 \leq (n*48)-(l+8) \leq 47$$

is true, where l is the length of payload as described in the length field 122.

In an alternate embodiment it is determined that ATM cell loss has occurred when $$(n*48)-(l+8)<0$$

and that cell insertion has occurred when $$(n*48)-(l+8)>47.$$

The previous two equations account for the fact that there can be a padding field which can vary from 0 bytes to 47 bytes in length. Prior knowledge of the length of the padding field at the receiver could also be used to make a determination as to the loss or insertion of a cell.

It can also be concluded that for MPEG services, an error is indicated when n is not equal to 5 or 8, and that for data services, an error is indicated when n is greater than a maximum allowable number.

Referring to FIG. 4, if the length error test 418 indicates that there is no length error, a CRC error test 434 is performed. In a preferred embodiment this CRC error test is based on the use of the CRC-32 field 126. CRC error tests are well understood by those skilled in the art.

If it is determined that both the length and the CRC of the received AAL5 CS-PDU are correct the procedure ends in a stop step 450. The procedure is then initiated with the reception of another AAL5 CS-PDU in the first step 410.

If the CRC error test 434 indicates that there is a CRC error in the AAL5 CS-PDU, the received AAL5 CS-PDU is replaced by m null MPEG packets 438.

In a preferred embodiment, if the length error test 418 indicates that there is a length error, a n<7 test 422 is performed. If the result of the n<7 test 422 is true, the received AAL5 CS-PDU is replaced by 1 null MPEG packet 422.

If the result of the n<7 test 422 is false, a n−4m=1 test 430 is performed. If the result of the n−4m=1 test 430 is false, the received AAL5 CS-PDU is replaced by m+1 null MPEG packets 446. If the result of the n−4m=1 test 430 is true, the received AAL5 CS-PDU is replaced by m null MPEG packets 438.

Subsequent to the replacing of the AAL CS-PDU by m+1 or m null MPEG packets, the procedure ends in a stop step 450. The procedure is then initiated with the reception of another AAL5 CS-PDU in the first step 410.

In an alternate embodiment a variable p is used to represent the number of null MPEG packets which need to be inserted. The variable p is set equal to one when n<7, is set equal to m when n≧7 and n−4m=1, and is set equal to m+1 when n≧7 and n−4m≠1.

Encoding/decoding of video using MPEG packets, as well as insertion of null MPEG packets and system aspects of MPEG video are described in ISO/IEC Standards 13818, Generic coding of moving pictures and associated audio information, Parts 1–9, which are incorporated herein by reference. Null MPEG packets allow the MPEG decoder to maintain the appropriate timing, and lost packets in a specified stream can be detected by examining the continuity counter in the MPEG transport header.

In an alternate embodiment, errors in the received MPEG packets are signaled to the MPEG layer by setting a transport error indication bit equal to '1'. The MPEG layer, knowing that errors have occurred, can deal with the erred packets and avoid image blocking or freezing.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. In a communications system receiving cells containing sections of a protocol data unit, wherein said protocol data unit contains at least one packet of digital information, a method of handling errors in said packets of digital information, said method comprising the steps of:
   a) receiving a first number of cells equal to n, wherein n is the number of cells forming said protocol data unit;
   b) determining a value l equal to the length of said protocol data unit as described in a trailer field of said protocol data unit
   c) determining whether there is an error in the length of said received protocol data unit;
   d) determining a value p equal to the number of erred packets of digital information; and
   e) substituting p null packets for those p packets of digital information which contain errors.

2. The method described in claim 1 wherein step c) is accomplished by determination that there is an error in the length of said received protocol data unit when the relationship $0 \leq (n*48)-(l+8) \leq 47$ is not true.

3. In a communications system receiving cells containing sections of a protocol data unit, wherein said protocol data unit contains at least one packet of digital information and a cyclical redundancy check field, a method of handling errors in said packets, said method comprising the steps of:
   a) receiving a first number of cells equal to n, wherein n is the number of cells forming a protocol data unit;
   b) determining a value m equal to the number of packets of digital information in said protocol data unit wherein m is determined as m=Integer[n/4];
   c) determining whether there is an error in said cyclical redundancy check of said received protocol data unit; and
   d) substituting m null packets for those m packets of digital information which contain errors.

4. The method described in claim 3 wherein said packets contain compressed MPEG digital video signals.

5. The method described in claim 3 wherein said protocol data units are ATM AAL5 Convergence Sublayer Protocol Data Units.

6. In a communications system receiving cells containing sections of a protocol data unit, wherein said protocol data unit contains at least one packet of digital information, a method of handling errors in said packets of digital information, said method comprising the steps of:
   a) receiving a first number of cells equal to n, wherein n is the number of cells forming said protocol data unit;
   b) determining a value m equal to the number of packets of digital information in said protocol data unit;
   c) determining a value l equal to the length of said protocol data unit as described in a trailer field of said protocol data unit;
   d) determining whether there is an error in the length of said received protocol data unit;
   e) determining a value p equal to the number of erred packets of digital information; and
   f) substituting p null packets for those p packets of digital information which contain errors.

7. The method described in claim 6 wherein step b) is accomplished by setting m=Integer[n/4].

8. The method described in claim 6 wherein step d) is accomplished by determining that there is an error in the length of said received protocol data unit when the relationship $0 \leq (n*48)-(l+8) \leq 47$ is not true.

9. The method described in claim 6 wherein step e) is accomplished by setting p equal to one when n<7, p equal to m when n≧7 and n−4m=1, p equal to m+1 when n≧7 and n−4m≠1.

10. The method described in claim 6 wherein said packets contain compressed MPEG digital video signals.

11. The method described in claim 6 wherein said protocol data units are ATM AAL5 Convergence Sublayer Protocol Data Units.

12. In a communications system receiving cells containing sections of a protocol data unit, wherein said protocol data unit contains at least one packet of digital information, a method of handling errors in said packets of digital information, said method comprising the steps of:
   a) receiving a first number of cells equal to n, wherein n is the number of cells forming said protocol data unit;
   b) determining a value l equal to the length of said protocol data unit as described in a trailer field of said protocol data unit;
   c) determining whether there is an error in the length of said received protocol data unit when the relationship $0 \leq (n*48)-(l+8) \leq 47$ is not true; and
   d) indicating to a subsequent information processing layer that there is an error in said packets of digital information.

13. In a communications system receiving cells containing sections of a protocol data unit, wherein said protocol data unit contains at least one packet of digital information with a cyclical redundancy check field, a method of handling errors in said packets, said method comprising the steps of:
   a) receiving a first number of cells equal to n, wherein n is the number of cells forming a protocol data unit;
   b) determining a value m equal to the number of packets of digital information in said protocol data unit wherein m is determined as m=Integer[n/4];
   c) determining whether there is an error in said cyclical redundancy check of said received protocol data unit; and
   d) indicating to a subsequent information processing layer that there is an error in said m packets of digital information.

14. In a communications system receiving cells containing sections of a protocol data unit, wherein said protocol data unit contains at least one packet of MPEG compressed digital information, a method of determining that errors have occurred in the transmission of said packets, said method comprising the steps of:

a) receiving a first number of cells equal to n, wherein n is the number of cells forming a protocol data unit;

b) determining that there is an error in the number of cells received when n is not equal to five or eight; and c) indicating to a subsequent information processing layer that there is an error in said at least one packet of MPEG compressed digital information.

15. In a communications system receiving cells containing sections of a protocol data unit, wherein said protocol data unit contains at least one packet of MPEG compressed digital information, a method of determining that errors have occurred in the transmission of said packets, said method comprising the steps of:

a) receiving a first number of cells equal to n, wherein n is the number of cells forming a protocol data unit;

b) determining that there is an error in the number of cells received when n is not equal to five or eight; and c) substituting a null packet for said at least one packet of MPEG compressed digital information.

16. In a communications system receiving cells containing sections of a protocol data unit, wherein said protocol data unit contains at least one packet of digital information, a method of determining that errors have occurred in the transmission of said packets, said method comprising the steps of:

a) receiving a first number of cells equal to n, wherein n is the number of cells forming a protocol data unit;

b determining that there is an error in the number of cells received when n is not equal to five or eight; and c) indicating to a subsequent information processing layer that there is an error in said protocol data unit.

17. In a communications system receiving cells containing sections of a protocol data unit, wherein said protocol data unit contains at least one packet of digital information, a method of determining that errors have occurred in the transmission of said packets, said method comprising the steps of:

a) receiving a first number of cells equal to n, wherein n is the number of cells forming a protocol data unit;

b) determining that there is an error in the number of cells received when n is not equal to five or eight; and c) substituting a null packet for said protocol data unit.

18. In a communications system receiving cells containing sections of a protocol data unit, wherein said protocol data unit contains at least one packet of digital information, an apparatus for handling errors in said packets of digital information, said apparatus comprising:

a) means for receiving a first number of cells equal to n, wherein n is the number of cells forming said protocol data unit;

b) means for determining a value l equal to the length of said protocol data unit as described in a trailer field of said protocol data unit c) means for determining whether there is an error in the length of said received protocol data unit;

d) means for determining a value p equal to the number of erred packets of digital information; and e) means for substituting p null packets for those p packets of digital information which contain errors.

19. The apparatus described in claim 18 wherein c) further comprises means for determination that there is an error in the length of said received protocol data unit when the relationship $0 \leq (n*48)-(l+8) \leq 47$ is not true.

20. In a communications system receiving cells containing sections of a protocol data unit, wherein said protocol data unit contains at least one packet of digital information and a cyclical redundancy check field, an apparatus for handling errors in said packets, said apparatus comprising:

a) means for receiving a first number of cells equal to n, wherein n is the number of cells forming a protocol data unit;

b) means for determining a value m equal to the number of packets of digital information in said protocol data unit wherein m is determined as m=Integer[n/4];

c) means for determining whether there is an error in said cyclical redundancy check of said received protocol data unit; and d) means for substituting m null packets for those m packets of digital information which contain errors.

21. The apparatus described in claim 20 wherein said packets contain compressed MPEG digital video signals.

22. The apparatus described in claim 20 wherein said protocol data units are ATM AAL5 Convergence Sublayer Protocol Data Units.

23. In a communications system receiving cells containing sections of a protocol data unit, wherein said protocol data unit contains at least one packet of digital information, an apparatus for handling errors in said packets of digital information, said apparatus comprising:

a) means for receiving a first number of cells equal to n, wherein n is the number of cells forming said protocol data unit;

b) means for determining a value m equal to the number of packets of digital information in said protocol data unit;

c) means for determining a value l equal to the length of said protocol data unit as described in a trailer field of said protocol data unit;

d) means for determining whether there is an error in the length of said received protocol data unit;

e) means for determining a value p equal to the number of erred packets of digital information; and f) means for substituting p null packets for those p packets of digital information which contain errors.

24. The apparatus described in claim 23 wherein b) further comprises means for setting m=Integer[n/4].

25. The apparatus described in claim 23 wherein d) further comprises means for determining that there is an error in the length of said received protocol data unit when the relationship $0 \leq (n*48)-(l+8) \leq 47$ is not true.

26. The apparatus described in claim 23 wherein e) further comprises means for setting p equal to one when n<7, p equal to m when n≧7 and n−4m=1, p equal to m+1 when n≧7 and n−4m≠1.

27. The apparatus described in claim 23 wherein said packets contain compressed MPEG digital video signals.

28. The apparatus described in claim 23 wherein said protocol data units are ATM AAL5 Convergence Sublayer Protocol Data Units.

29. In a communications system receiving cells containing sections of a protocol data unit, wherein said protocol data unit contains at least one packet of digital information, an apparatus for handling errors in said packets of digital information, said apparatus comprising:

a) means for receiving a first number of cells equal to n, wherein n is the number of cells forming said protocol data unit;

b) means for determining a value l equal to the length of said protocol data unit as described in a trailer field of said protocol data unit;

c) means for determining whether there is an error in the length of said received protocol data unit when the relationship $0 \leq (n*48)-(l+8) \leq 47$ is not true; and d) means for indicating to a subsequent information processing layer that there is an error in said packets of digital information.

30. In a communications system receiving cells containing sections of a protocol data unit, wherein said protocol data unit contains at least one packet of digital information with a cyclical redundancy check field, an apparatus for handling errors in said packets, said apparatus comprising:

a) means for receiving a first number of cells equal to n, wherein n is the number of cells forming a protocol data unit;

b) means for determining a value m equal to the number of packets of digital information in said protocol data unit wherein m is determined as m=Integer[n/4];

c) means for determining whether there is an error in said cyclical redundancy check of said received protocol data unit; and d) means for indicating to a subsequent information processing layer that there is an error in said m packets of digital information.

31. In a communications system receiving cells containing sections of a protocol data unit, wherein said protocol data unit contains at least one packet of MPEG compressed digital information, an apparatus for determining that errors have occurred in the transmission of said packets, said apparatus comprising:

a) means for receiving a first number of cells equal to n, wherein n is the number of cells forming a protocol data unit;

b) means for determining that there is an error in the number of cells received when n is not equal to five or eight; and c) means for indicating to a subsequent information processing layer that there is an error in said at least one packet of MPEG compressed digital information.

32. In a communications system receiving cells containing sections of a protocol data unit, wherein said protocol data unit contains at least one packet of MPEG compressed digital information, an apparatus for determining that errors have occurred in the transmission of said packets, said apparatus comprising:

a) means for receiving a first number of cells equal to n, wherein n is the number of cells forming a protocol data unit;

b) means for determining that there is an error in the number of cells received when n is not equal to five or eight; and c) means for substituting a null packet for said at least one packet of MPEG compressed digital information.

33. In a communications system receiving cells containing sections of a protocol data unit, wherein said protocol data unit contains at least one packet of digital information, an apparatus for determining that errors have occurred in the transmission of said packets, said apparatus comprising:

a) means for receiving a first number of cells equal to n, wherein n is the number of cells forming a protocol data unit;

b) means for determining that there is an error in the number of cells received when n is not equal to five or eight; and c) means for indicating to a subsequent information processing layer that there is an error in said protocol data unit.

34. In a communications system receiving cells containing sections of a protocol data unit, wherein said protocol data unit contains at least one packet of digital information, an apparatus for determining that errors have occurred in the transmission of said packets, said apparatus comprising:

a) means for receiving a first number of cells equal to n, wherein n is the number of cells forming a protocol data unit;

b) means for determining that there is an error in the number of cells received when n is not equal to five or eight; and c) means for substituting a null packet for said protocol data unit.

* * * * *